Dec. 16, 1930.  M. H. SHOENBERG ET AL  1,785,366
SIGNALING SYSTEM
Filed June 7, 1927  2 Sheets-Sheet 1
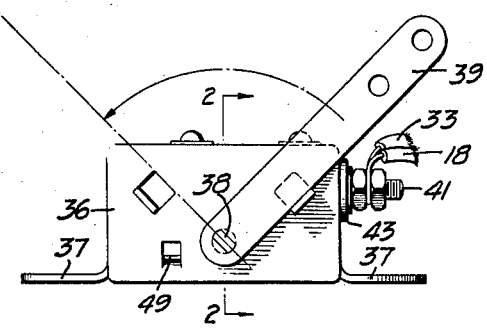
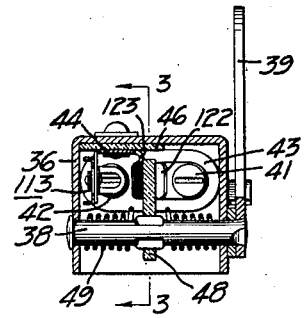
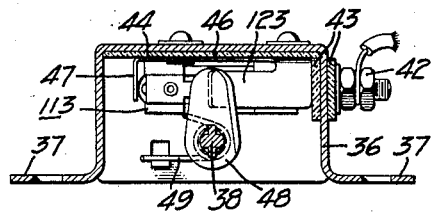
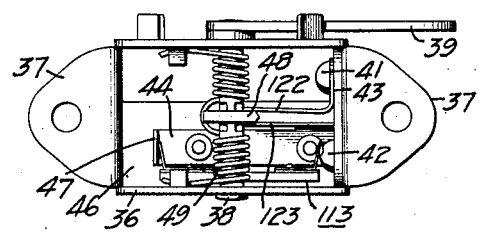
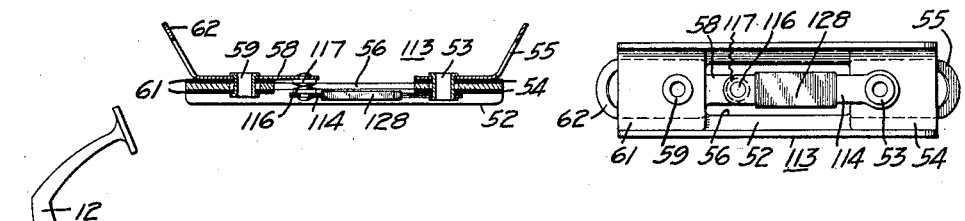
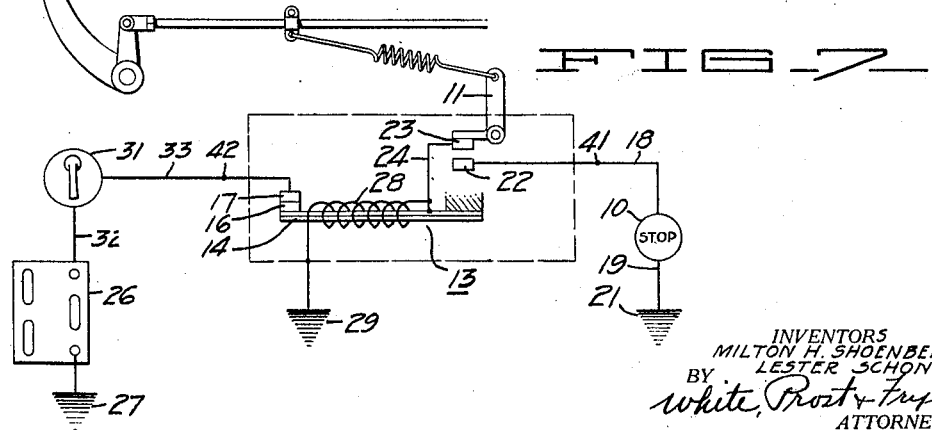
INVENTORS
MILTON H. SHOENBERG
LESTER SCHON
BY
ATTORNEYS

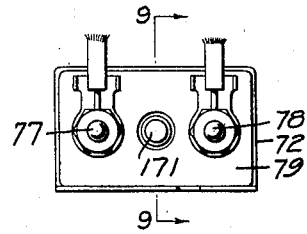
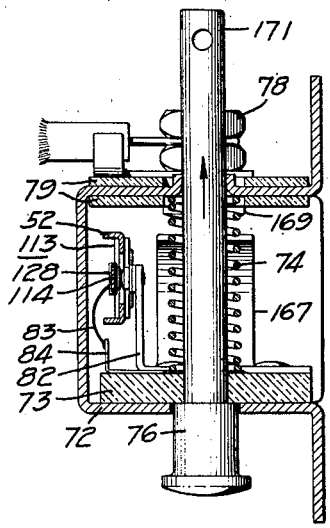
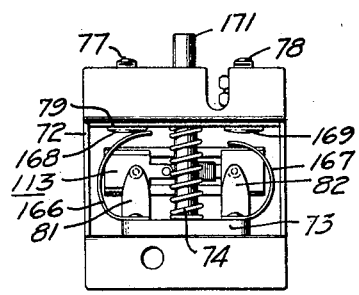
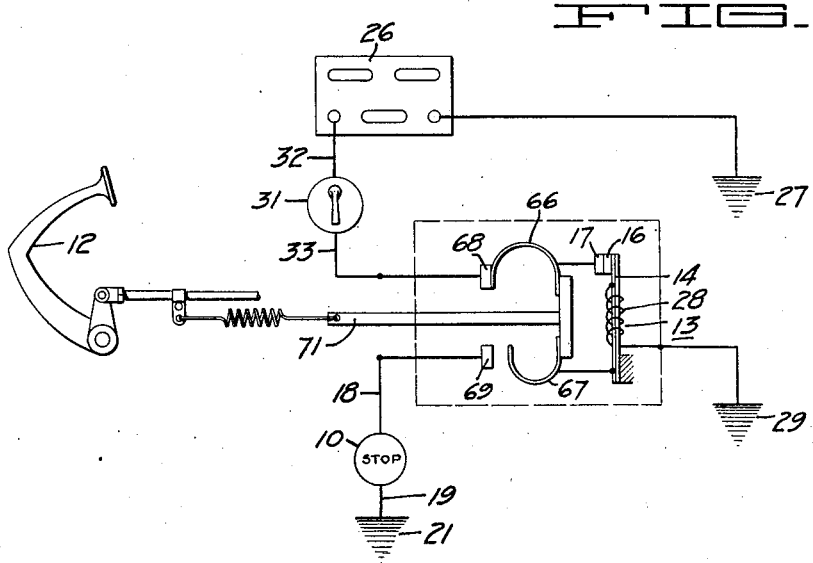

Patented Dec. 16, 1930

1,785,366

UNITED STATES PATENT OFFICE

MILTON H. SHOENBERG AND LESTER SCHON, OF SAN FRANCISCO, CALIFORNIA; SAID SCHON ASSIGNOR TO SAID SHOENBERG

SIGNALING SYSTEM

Application filed June 7, 1927. Serial No. 197,057.

This invention relates generally to signaling systems for use on automobiles whereby a driver may convey certain signals to the drivers of other cars. For example it may be used with stop signals or with signals which indicate a right or left turn.

It is an object of this invention to devise a novel type of automobile signaling system in which a signal lamp is repeatedly flashed in order to attract attention.

It is a further object of this invention to devise a novel type of flashing lamp signal system for an automobile which will be under direct control of the ignition switch, thus rendering the system inoperative when the ignition switch is turned off.

It is a further object of this invention to devise a novel type of automobile signaling system which will incorporate a bi-metallic circuit interrupter.

It is a further object of this invention to devise a combined manually operated switch and a bi-metallic circuit interrupter for incorporation with an automobile signaling system.

Further objects of this invention will appear from the following description in which we have set forth the preferred embodiment of our invention. It is to be understood that the appended claims are to be accorded a range of equivalents consistent with the state of the prior art.

Referring to the drawing:

Figure 1 is a side elevational view of a control switch combined with a bi-metallic circuit controller.

Fig. 2 is a cross sectional view taken along the line 2—2 of Fig. 1.

Fig. 3 is a cross sectional view taken along the line 3—3 of Fig. 2.

Fig. 4 is a bottom plan view of the switch device shown in Fig. 1.

Fig. 5 is a detail illustrating the bi-metallic circuit controller incorporated with the switch shown in Figs. 1 to 4 inclusive.

Fig. 6 is a plan view of the circuit controller shown in Fig. 5.

Fig. 7 is a circuit diagram illustrating schematically the signaling system of this invention.

Fig. 8 is an end view of a modified form of switch which incorporates a bi-metallic circuit controller.

Fig. 9 is a cross sectional view taken along the line 9—9 of Fig. 8.

Fig. 10 is a bottom plan view of the switch shown in Fig. 9.

Fig. 11 is a circuit diagram illustrating schematically a signaling system incorporating the switch shown in Figs. 8 to 10 inclusive.

The system of this invention may be outlined briefly as comprising a signal lamp which is associated with a suitable energizing circuit. The source of current for the circuit is usually the standard six or twelve volt storage battery provided upon automobiles. This circuit is controlled by a switch which is adapted to be operated by the driver. For example in the case of a stop light signaling system, this switch is operated by depression of the automobile brake pedal. Also associated with the energizing circuit, there is an automatic circuit controlling device which is adapted to repeatedly vary the current supplied to the signal lamp. This controller is electrically energized and is directly controlled by the ignition switch of the automobile. In other words as long as the automobile engine is in operation and the ignition switch is "on" the controller continually operates and when the driver controlled switch is actuated, the signal lamp is repeatedly flashed without an appreciable time lag. The circuit controller is preferably of the bi-metallic type and is incorporated as a unit with the driver operated control switch.

Referring first to Figure 7, we have illustrated the invention as being incorporated with the usual form of automobile stop signaling system. In such a system there is provided the stop lamp 10 which is generally arranged at the rear part of an automobile, and a control switch 11 which is adapted to be manually operated upon compression of the automobile brake pedal 12. In the usual form of stop signaling system the signal lamp burns steadily as long as the brake pedal is depressed. It is a commonly accepted fact that a lamp which is repeatedly flashed, will attract far more attention than a lamp which burns steadily. In order to secure a flashing effect of a signal lamp, we utilize a circuit controller 13 which is associated with the energizing circuit of the lamp 10. That form of circuit controller which we prefer to employ is of the bi-metallic type which includes for example a bi-metallic strip 14 carrying at its free end a movable contact 16, adapted to cooperate with a stationary contact 17.

The energizing circuit for the signal lamp may be of the two conductor type, although for simplicity we have shown a circuit which utilizes the frame of the automobile for a return conductor. Thus leading from lamp 10 are the two conductors 18 and 19, conductor 19 being provided with a ground connection 21. Conductor 18 connects to one contact 22 of switch 11, while the other contact 23 of this switch connects to one of the contacts of circuit controller 13, for example the contact 16, through conductor 24. The other contact 17 of the circuit controller is connected to the positive terminal of the automobile storage battery 26, the negative end of which is provided with the ground connection 27. In thermal contact with the bi-metallic strip 14, there is a resistance element 28 having its terminals connected in shunt with the series arrangement provided by switch 11 and lamp 10. In other words when the switch 11 is closed, resistance element 28 is connected directly in shunt with lamp 10. This connection may be conveniently made by leading one terminal of resistance 28 to a ground connection 29, and connecting the other to the conductor 24 as shown.

As previously mentioned, the system incorporates the ignition switch of an automobile so that when the ignition switch is turned on the circuit controller is continuously operated to flash the signal lamp any time the operator presses the brake pedal. In Fig. 7, switch 31 represents a standard type of automobile engine ignition switch from which are taken off the terminal conductors 32 and 33. Conductor 32 is connected to the positive terminal of storage battery 26, while conductor 33 is connected to the stationary contact 17. It is of course to be understood that the ignition switch 31 should be connected so that it will be able to control the signal circuit, as well as the ignition circuit of the engine.

In operation when the ignition switch 31 is turned on for starting the automobile engine, current flows thru a circuit traced from storage battery 26, through ignition switch 31, normally closed contacts 16 and 17, heating resistance 28, and back through the negative terminal of storage battery 26, thus causing the resistance 28 to increase the temperature of bi-metallic strip 14. Within a short time the strip 14 is flexed to open contacts 16 and 17, and their opening interrupts the flow of current through resistance 28, thus permitting strip 14 to cool and contacts 16 and 17 to again become closed. This cycle is repeated recurrently as long as ignition switch 31 is turned on, in other words the circuit controller 13 serves to automatically open and close contacts 16 and 17 at a relatively rapid rate while the automobile is in operation. Now assuming that the brake pedal 12 is moved to close switch 11, stop lamp 10 is energized by a circuit which may be traced along conductor 18, contacts 22 and 23, conductor 24, contacts 16 and 17, conductor 33, switch 31 and to the positive terminal of battery 26. The repeated opening and closing of contacts 16 and 17 will therefore serve to recurrently vary or interrupt the supply of current to the lamp 10, thus flashing the lamp at a relatively rapid rate.

The principal object in providing a circuit controller which operates continuously, is to minimize the time lag between closing of switch 11 and flashing of the lamp 10. If the controller is not operated continuously, then an appreciable time is required subsequent to closing of switch 11 for the circuit controller to initiate its operation to flash the lamp. Another advantage in utilizing the ignition switch is that if the switch 11 becomes injured and remains closed, the signal lamp will not continue to burn and run down the storage battery if the automobile is idle. If resistance 28 becomes injured, then contacts 16 and 17 remain closed and the systems operate to burn the lamp steadily, thus providing an additional "safety" feature.

In Figs. 1 to 4 inclusive we have shown a combined switch and circuit controller suitable for use in a system such as described above. This switch comprises a metal housing or casing 36 provided with suitable means such as lugs 37 for attaching the same to the frame of an automobile. Journaled within the casing 36 there is a shaft 38, the projecting end of which carries an actuating lever 39. Disposed within the casing 36, are the two spring contact strips 122 and 123 which are normally adapted to press against and make electrical contact with each other. A pair of external binding posts 41 and 42 are disposed upon one end of casing 36, these binding posts being mounted upon insulating strips 43 and being insulated from the metal casing 36. For convenience binding post 41 may be utilized as a means for retaining the contact strip 122 upon the inner insulating strip 43. The contact 123 is retained in operable position as by forming the same as an integral part of a conductor strip 44, which is suitably mounted on the insulating member 46. The end of conductor strip 44 is provided with an upturned end 47 for a purpose to be later described. The contacts 122 and 123 are adapted to be separated by a wedge-shaped finger 48, of insulating material, which is fixed to the shaft 38. This shaft together with lever 39, is normally biased in a direction to maintain the finger 48 between contacts 122 and 123, as for example by means of a helical spring 49. It is to be understood of course that the external lever 39 is connected to one of the operating parts of an automobile, as for example the brake lever or brake rod, so that upon compression of the brake pedal shaft 38 rocks to remove the finger 48 from between the contacts 122 and 123, thus permitting the contacts to close.

Incorporated with the switch which has just been described and disposed within the same metal housing 36, there is a circuit controller 113 of the bi-metallic type shown in detail in Figs. 5 and 6. A variety of circuit controllers may be employed with the system described above although I prefer to utilize one which operates in response to an electrical current to repeatedly open and close a pair of contacts. A bi-metallic type of circuit controller is preferable because of its simplicity, reliability, and cheapness to manufacture. The type of bi-metallic circuit controller shown has been found to give excellent results and is constructed with a relatively short bi-metallic strip 114, having its one end mounted upon a plate 52, as by means of eyelet 53. The strip 114 and eyelet 53 are preferably insulated from plate 52, as by means of the insulating members 54. For making external connections to the bi-metallic strip 114, eyelet 53 also passes through a metal terminal strip 55. The plate 52 is provided with an aperture or recess 56 to provide sufficient space for operation of the bi-metallic strip 114. Secured to the free end of bi-metallic strip 114, there is a movable contact 116, cooperating with a relatively stationary contact 117. Contact 117 is retained in operable position by means of a conductor strip 58 which is mounted upon the plate 52, as by means of eyelet 59, the eyelet and conductor strip 58 being insulated from plate 52 as by means of insulating members 61. Conductor strip 58 is extended laterally to provide another terminal strip 62. Disposed in thermal contact with the bi-metallic strip 114, there is a suitable resistance element 128, which for example may comprise a relatively fine wire or ribbon insulated from strip 114, and wound about the same.

The circuit controller is disposed within the casing 36, as shown in Figs. 2, 3 and 4. The terminal strips 55 and 62 are soldered to or otherwise securely connected to the inner end of binding post 52, and to the upturned end 47 of conductor strip 44. One terminal of the resistance element 128 is connected to the bimetallic strip 114, while the other end is grounded to the metal casing 36, which connection causes this terminal to be grounded to the metal frame of an automobile, after the casing 36 has been mounted upon the same.

In Figs. 8 to 10 inclusive we have illustrated the bi-metallic circuit controller combined with another type of control switch. This switch utilizes a pair of movable contacts, which are actuated by a sliding rod, rather than a rocking shaft. This switch can best be understood by referring first to Fig. 11, which is a diagram showing a switch of this kind incorporated with the signaling system of this invention. This switch includes a pair of movable contacts 66 and 67 which cooperate with a pair of stationary contacts 68 and 69 respectively. Conductor 18 from the stop lamp 10 connects to stationary contact 69, and conductor 33 from the ignition switch 31 connects directly to switch contact 68. The controller contact 17 connects directly to the movable contact 66, while stationary contact 16 and bi-metallic strip 14 connect to the other contact 67. Movable contacts 66 and 67 are adapted to be moved simultaneously by means of rod 71, which is operably connected to suitable means such as the automobile brake pedal 12. The operation of this arrangement is practically the same as that described before with reference to Figure 7. When the ignition switch 31 is turned on a circuit is established through the normally closed contacts 16 and 17 and the bi-metallic controller functions to repeatedly open and close the contacts. In the released position of pedal 12 it is to be noted that spring contact 66 is in electrical contact with contact 68. When the pedal 12 is depressed, contacts 67 and 69 are closed and a circuit is established which includes the stop lamp 10, and this lamp is supplied with recurrently varying current from the storage battery, thus causing it to light repeatedly.

Referring now to the details of Figs. 8 to 10 inclusive it will be noted that the switch incorporates a suitable metal casing 72 which is adapted to be mounted upon the frame of an automobile. Slidably disposed within this casing, there is actuating rod 171, one end of which is adapted to be connected to the brake rod or other part of an automobile. Disposed upon the rod 171 within casing 72, there is a movable crosshead 73, preferably made of insulating material. Crosshead 73 is normally urged toward one side of casing 72 as by means of a compression spring 74, and is adapted to be moved against the pressure of spring 74 by sliding movement of rod 171, as this rod is provided with an enlarged head 76 abutting the crosshead 73. Stationary contacts 168 and 169 are formed at the inner ends of the binding posts 77 and 78 respectively, these posts being mounted upon the insulating members 79. The spring contacts 166 and 167 in this case are each provided with integral tabs 81 and 82 which serve to support and make electrical connection with the terminals of the circuit controller 113. This circuit is substantially identical to that shown in Figs. 5 and 6 with the exception that the terminal strips 55 and 62 have been eliminated, and the tabs 81 and 82 are soldered or otherwise connected directly to the eyelets 59 and 53 respectively. That terminal of the resistance element 128 which is grounded to the automobile frame, and thus to the metallic casing 72, may be brought out in the form of a terminal wire 83 and electrically connected to a metal strip 84, this strip being perforated to receive the rod 171, and serving as a means against which the end of spring 74 presses.

This latter type of switch is preferable since it is more reliable in operation than the switch shown in Figs. 1 to 4 inclusive. The circuit controller and the crosshead are in the form of a unit which may be readily removed from the casing merely by removing the rod 171. By bending the contact 166 so that it no longer normally engages with contact 168, the operation of the system may be modified. In this case turning on of the ignition switch will not initiate the controller into operation, but the controller will only operate when the brake pedal is depressed and the manual control switch is closed.

We claim:

1. In combination with an automobile having the usual engine ignition switch, a signaling system including a signal lamp, a circuit associated with said lamp including a source of current, a switch adapted to be operated by a driver to open and close the circuit for supplying current to the lamp, and an automatic circuit controller of the bi-metallic type, said controller being electrically connected to said source of current in series with said ignition switch whereby said controller is continually operated when the ignition switch is on, said controller having a pair of contacts included in the lamp circuit, the contacts being adapted to recurrently open and close when the ignition switch is on, to flash the signal lamp when the driver operated switch is closed.

2. In combination with an automobile having the usual engine ignition switch, a signaling system including a signal lamp, a circuit for said lamp including a source of current, a switch adapted to be operated by a driver to open and close the lamp circuit, and a thermostatic flasher connected to said source of current in series with the ignition switch whereby the flasher is continually operated when the ignition switch is closed, the contacts of said flasher being connected in series with said driver operated switch.

3. In combination with an automobile having the usual engine ignition switch, a source of current, a bi-metallic switch having its contacts and operating coil in series with said ignition switch, a driver operated switch and signal lamp connected in series with the contacts of said bi-metallic switch and in shunt to said operating coil.

In testimony whereof, we have hereunto set our hands.

MILTON H. SHOENBERG.
LESTER SCHON.